United States Patent
Gillette et al.

(10) Patent No.: US 8,407,341 B2
(45) Date of Patent: Mar. 26, 2013

(54) MONITORING COMMUNICATIONS

(75) Inventors: Zachary Lynn Gillette, Charlotte, NC (US); Amanda Sorensen, Huntersville, NC (US)

(73) Assignee: Bank of America Corporation, Charlotte, NC (US)

( * ) Notice: Subject to any disclaimer, the term of this patent is extended or adjusted under 35 U.S.C. 154(b) by 294 days.

(21) Appl. No.: 12/833,489

(22) Filed: Jul. 9, 2010

(65) Prior Publication Data

US 2012/0011245 A1    Jan. 12, 2012

(51) Int. Cl.
*G06F 15/16* (2006.01)
(52) U.S. Cl. .................................. 709/224; 709/206
(58) Field of Classification Search .................. 709/206, 709/224; 726/22
See application file for complete search history.

(56) References Cited

U.S. PATENT DOCUMENTS

| | | | |
|---|---|---|---|
| 7,360,165 B2 | 4/2008 | Cortright et al. | |
| 7,401,356 B2 | 7/2008 | Bandini et al. | |
| 2002/0112008 A1 | 8/2002 | Christenson et al. | |
| 2002/0129140 A1* | 9/2002 | Peled et al. | 709/224 |
| 2002/0199120 A1 | 12/2002 | Schmidt | |
| 2004/0015554 A1 | 1/2004 | Wilson | |
| 2004/0230536 A1 | 11/2004 | Fung et al. | |
| 2004/0243832 A1* | 12/2004 | Wilf et al. | 713/200 |
| 2004/0255147 A1 | 12/2004 | Peled et al. | |
| 2005/0137991 A1 | 6/2005 | Bruce et al. | |
| 2005/0257261 A1 | 11/2005 | Shraim et al. | |
| 2005/0288939 A1* | 12/2005 | Peled et al. | 705/1 |
| 2006/0068755 A1 | 3/2006 | Shraim et al. | |
| 2006/0069697 A1 | 3/2006 | Shraim et al. | |
| 2006/0080735 A1 | 4/2006 | Brinson et al. | |
| 2007/0073519 A1 | 3/2007 | Long | |
| 2007/0107053 A1 | 5/2007 | Shraim et al. | |
| 2007/0192853 A1 | 8/2007 | Shraim et al. | |
| 2007/0220604 A1 | 9/2007 | Long | |
| 2009/0129400 A1 | 5/2009 | Dibiaso et al. | |
| 2009/0144408 A1* | 6/2009 | Wilf et al. | 709/224 |
| 2009/0241197 A1* | 9/2009 | Troyansky | 726/26 |
| 2009/0319363 A1 | 12/2009 | Callaghan et al. | |
| 2010/0017844 A1 | 1/2010 | Barve et al. | |

OTHER PUBLICATIONS

International Search Report received in corresponding Application No. PCT/US2011/035314 mailed Aug. 3, 2011.

* cited by examiner

*Primary Examiner* — Liangche A Wang
*Assistant Examiner* — Cheikh Ndiaye
(74) *Attorney, Agent, or Firm* — Banner & Witcoff, Ltd.; Michael A. Springs

(57) ABSTRACT

Methods, computer readable media, and apparatuses for monitoring communications are presented. A first username may be compared with a second username. The first username may be associated with a sender of a communication, and the second username may be associated with a recipient of the communication. Thereafter, based on the comparing, the probability that the first username and the second username are both associated with a single entity may be determined. In at least one arrangement, in response to determining that the probability exceeds a threshold, it may be determined that the first username and the second username are both associated with the single entity. In at least one additional arrangement, the threshold may be modified automatically based on previously analyzed incident data.

21 Claims, 9 Drawing Sheets ns depicted in FIG. 1A include a local area network (LAN)
MONITORING COMMUNICATIONS

BACKGROUND

As computing devices are used more frequently by various organizations for a variety of functions, increasingly large amounts of information, including private information, may be stored on such devices. For example, within an organization, such as a financial institution, computing devices may store non-public information, such as customer names, addresses, account numbers, social security numbers, and/or the like.

All together, the functionalities provided by computing devices may greatly improve customer service, productivity, and process efficiency, among other things, within an organization. As more and more non-public information comes to be stored on computing devices that have various capabilities, however, it may be desirable to provide more convenient, usable, and/or secure ways of monitoring communications between computing devices to protect information and/or preserve confidentiality.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of this disclosure relate to monitoring communications. According to one or more aspects, a communication that includes non-public information may be identified. Subsequently, it may be determined whether the communication meets at least one outlier condition. An outlier condition may be a law, regulation, and/or policy (e.g., a policy implemented by an organization, such as a financial institution) that, if violated, may represent a risk and thus may trigger additional review. For instance, an outlier condition may evaluate whether a communication was sent from a particular user, at a particular time, to a particular domain, with a particular subject line, and/or with a particular type and/or amount of information. In response to determining that the communication meets the at least one outlier condition, the communication may be submitted for review.

According to one or more additional aspects, a first username may be compared with a second username. The first username may be associated with a sender of a communication, and the second username may be associated with a recipient of the communication. Thereafter, based on the comparison, the probability that the first username and the second username are both associated with a single entity may be determined. In at least one arrangement, in response to determining that the probability exceeds a threshold, it may be determined that the first username and the second username are both associated with the single entity. In at least one additional arrangement, the threshold may be modified automatically based on previously analyzed incident data.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1A:
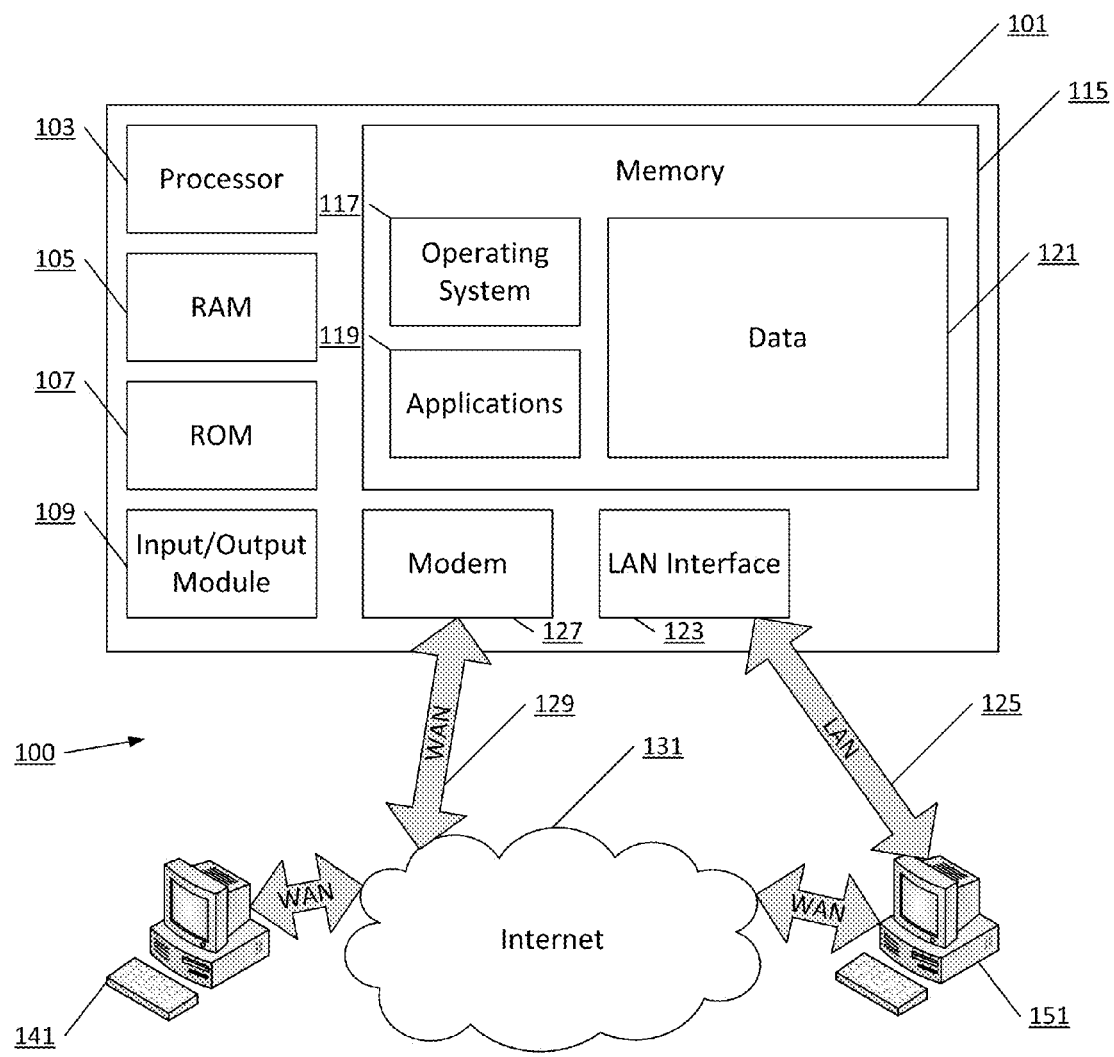
FIG. 1A illustrates an example operating environment in which various aspects of the disclosure may be implemented.

FIG. 1A illustrates an example block diagram of a generic computing device 101 (e.g., a computer server) in an example computing environment 100 that may be used according to one or more illustrative embodiments of the disclosure. The generic computing device 101 may have a processor 103 for controlling overall operation of the server and its associated components, including random access memory (RAM) 105, read-only memory (ROM) 107, input/output (I/O) module 109, and memory 115.

I/O 109 may include a microphone, mouse, keypad, touch screen, scanner, optical reader, and/or stylus (or other input device(s)) through which a user of generic computing device 101 may provide input, and may also include one or more of a speaker for providing audio output and a video display device for providing textual, audiovisual, and/or graphical output. Software may be stored within memory 115 and/or other storage to provide instructions to processor 103 for enabling generic computing device 101 to perform various functions. For example, memory 115 may store software used by the generic computing device 101, such as an operating system 117, application programs 119, and an associated database 121. Alternatively, some or all of the computer executable instructions for generic computing device 101 may be embodied in hardware or firmware (not shown).

The generic computing device 101 may operate in a networked environment supporting connections to one or more remote computers, such as terminals 141 and 151. The terminals 141 and 151 may be personal computers or servers that include many or all of the elements described above relative to the generic computing device 101. The network connections depicted in FIG. 1A include a local area network (LAN) 125 and a wide area network (WAN) 129, but may also include other networks. When used in a LAN networking environment, the computer 101 may be connected to the LAN 125 through a network interface or adapter 123. When used in a WAN networking environment, the generic computing device 101 may include a modem 127 or other network interface for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP, HTTPS, and the like is presumed.

Computing device 101 and/or terminals 141 or 151 may also be mobile terminals (e.g., mobile phones, PDAs, notebooks, and the like) including various other components, such as a battery, speaker, and antennas (not shown).

The disclosure is operational with numerous other general purpose or special purpose computing system environments or configurations. Examples of well known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 1B:
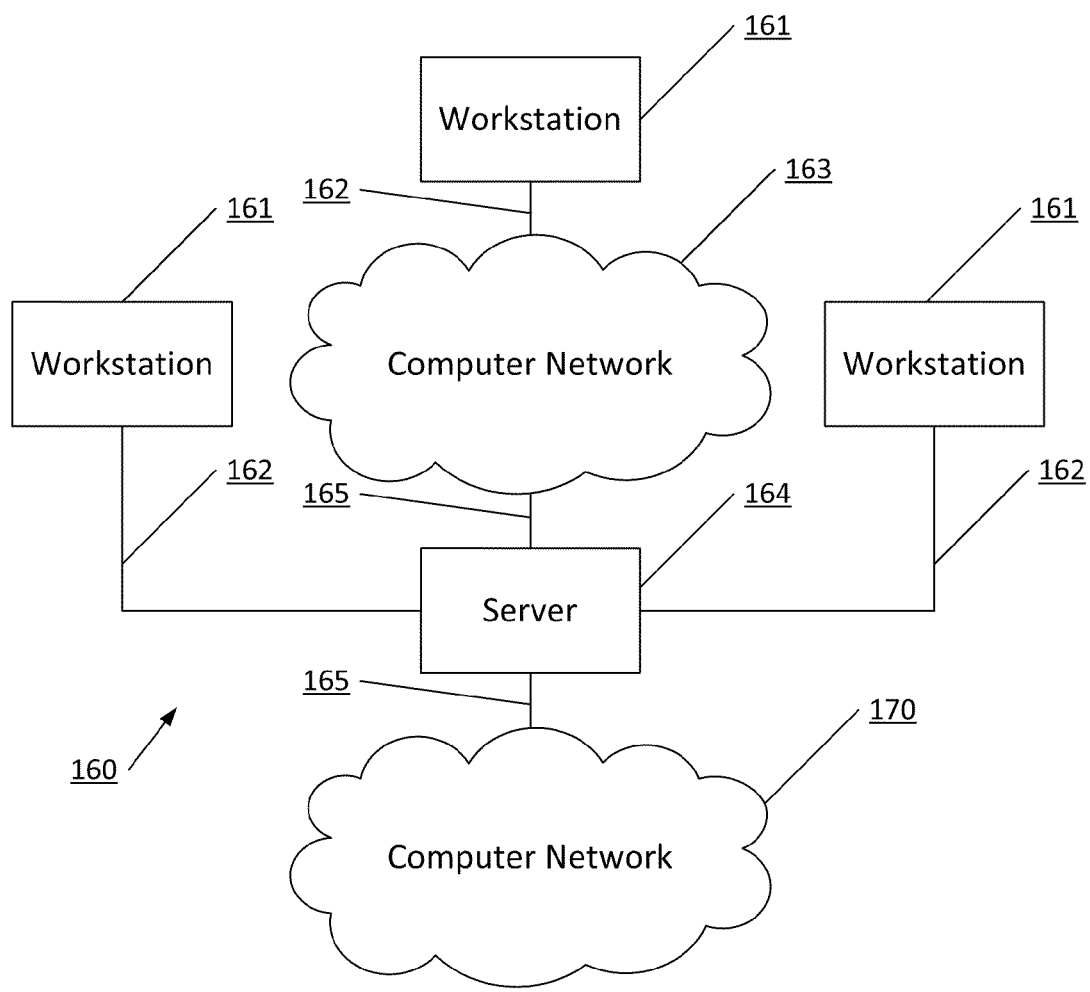
FIG. 1B illustrates another example operating environment in which various aspects of the disclosure may be implemented.

FIG. 1B illustrates another example operating environment in which various aspects of the disclosure may be implemented. As illustrated, system 160 may include one or more workstations 161. Workstations 161 may, in some examples, be connected by one or more communications links 162 to computer network 163 that may be linked via communications links 165 to server 164. In system 160, server 164 may be any suitable server, processor, computer, or data processing device, or combination of the same. Server 164 may be used to process the instructions received from, and the transactions entered into by, one or more participants.

According to one or more aspects, system 160 may be associated with a financial institution, such as a bank. Various elements may be located within the financial institution and/or may be located remotely from the financial institution. For instance, one or more workstations 161 may be located within a branch office of a financial institution. Such workstations may be used, for example, by customer service representatives, other employees, and/or customers of the financial institution in conducting financial transactions via network 163. Additionally or alternatively, one or more workstations 161 may be located at a user location (e.g., a customer's home or office). Such workstations also may be used, for example, by customers of the financial institution in conducting financial transactions via computer network 163 or computer network 170.

Computer network 163 and computer network 170 may be any suitable computer networks including the Internet, an intranet, a wide-area network (WAN), a local-area network (LAN), a wireless network, a digital subscriber line (DSL) network, a frame relay network, an asynchronous transfer mode network, a virtual private network (VPN), or any combination of any of the same. Communications links 162 and 165 may be any communications links suitable for communicating between workstations 161 and server 164, such as network links, dial-up links, wireless links, hard-wired links, and the like.

Figure 2:
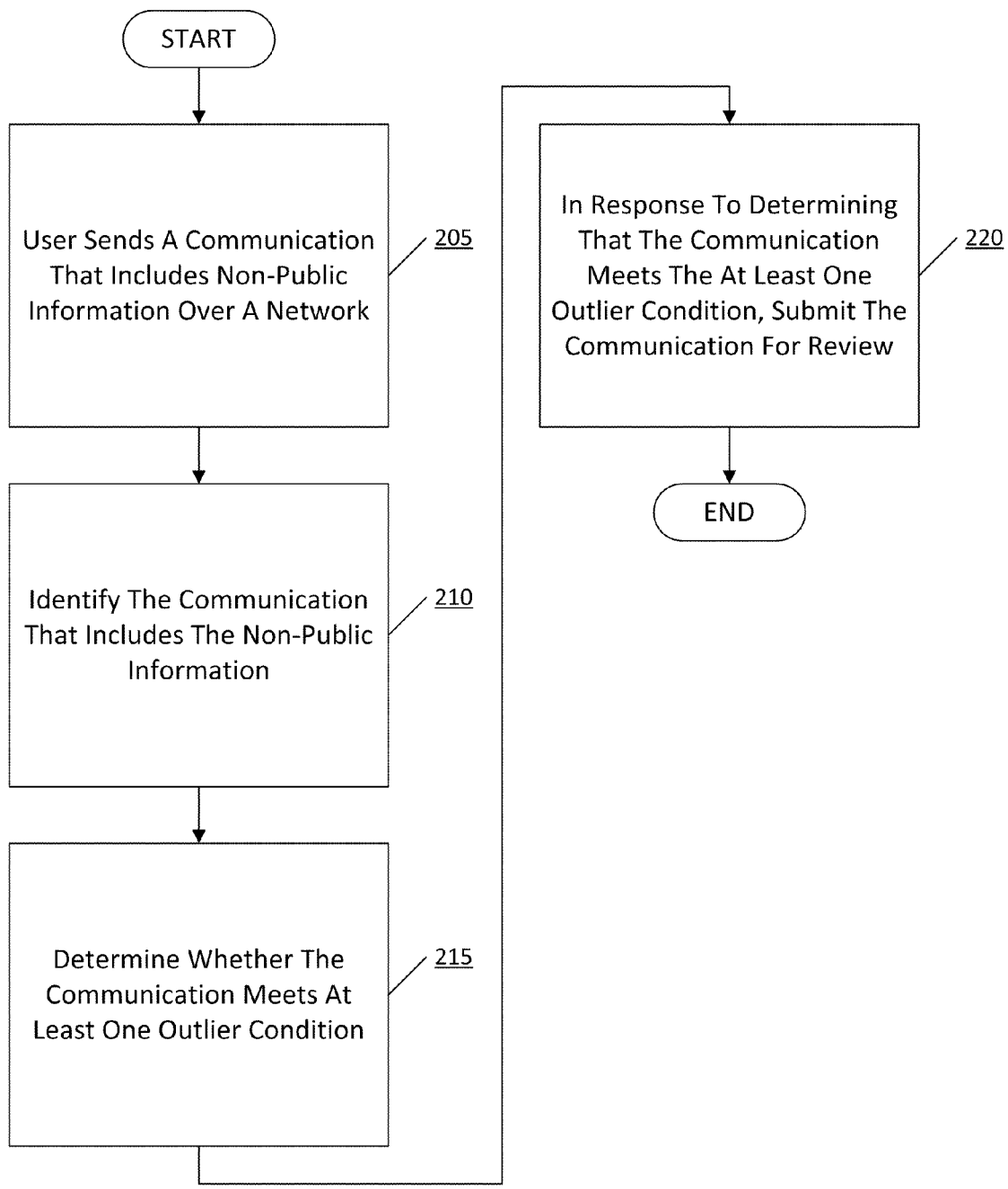
FIG. 2 illustrates an example method by which one or more communications may be monitored according to one or more aspects described herein.

FIG. 2 illustrates an example method by which one or more communications may be monitored according to one or more aspects described herein. According to one or more aspects, the methods described herein may be implemented by software executed on one or more computers, such as computing device 101 of FIG. 1A, and/or by a computing system, such as system 160 of FIG. 1B. In at least one arrangement, the methods described herein may be performed by a server (e.g., server 164), which may function as an electronic mail server. Additionally or alternatively, the methods described herein may be performed by and/or in combination with one or more workstations (e.g., workstations 161).

In step 205, a user may send a communication that includes non-public information over a network. For example, a user of a computer system at a financial institution may send an email that includes non-public information (e.g., customer names, account numbers, social security numbers, personal information, and the like) over a network, such as the Internet. The email may be encrypted, or it might not be encrypted. In at least one arrangement, whether the email is encrypted or not encrypted, the communication channel in which the email is sent may be monitored by another computer system and/or software executed on such a computer system. For instance, the communication channel and/or one or more email servers (e.g., one or more email servers associated with the financial institution) may be monitored by a communication monitoring tool, such as a software application made commercially available.

In step 210, the communication that includes the non-public information may be identified. For example, the communication monitoring tool and/or the one or more email servers associated with the communication channel in which the email is sent may be configured to identify and/or flag communications that include non-public information. These communications may be referred to as "incidents," and these incidents may require further analysis, as further described below. In at least one arrangement, the communication monitoring tool and/or the one or more email servers associated with the communication channel in which the email is sent may determine that a communication includes non-public information using one or more regular expressions, character matching functionalities, and/or string matching functionalities. For instance, the communication monitoring tool may be configured to identify and/or flag any communication that includes a string of numbers in the form of AAA-AA-AAAA, as such a string may represent a social security number that is likely non-public information. In another example, the communication monitoring tool may be configured to identify and/or flag any communication that includes a string of numbers in the form of AAAAAAAAAA-BBBBBBBBBB, as such a string may represent an account number that is likely non-public information. In still another example, the communication monitoring tool may be configured to identify and/or flag any communication that includes a string of characters in the form of AAA B CCCCCCCC, as such a string may represent a customer name that is likely non-public information.

In step 215, it may be determined whether the communication meets at least one outlier condition. An outlier condition may be a law, regulation, and/or policy (e.g., a policy implemented by an organization, such as a financial institution) that, if violated, may represent a risk that a communication was sent to further a fraud and/or otherwise use and/or disseminate non-public information in an unauthorized manner, and thus may trigger additional review. For instance, an outlier condition may evaluate whether a communication was sent from a particular user, at a particular time, to a particular domain, with a particular subject line, and/or with a particular type and/or amount of information. In response to determining that the communication meets the at least one outlier condition, the communication may be submitted for review.

For example, once the communication is identified in step 210 as containing non-public information (e.g., via the monitoring tool), a system implementing one or more aspects of the disclosure may determine whether the communication meets at least one outlier condition, which may involve performing one or more steps of the example method illustrated in FIG. 3, which is further described below. In short, the one or more outlier conditions against which the communication may be evaluated (and described below) may be used to identify situations in which there is a high risk that a communication was sent to further a fraud and/or otherwise use and/or disseminate non-public information in an unauthorized manner. For instance, by implementing one or more aspects of the disclosure and/or by evaluating communications against the outlier conditions described herein, an organization, such as a financial institution, may be able to identify instances where an employee of the organization has attempted to send and/or has sent non-public information to the employee's personal email address for fraudulent purposes and/or other unauthorized use.

In step 220, in response to determining that the communication meets the at least one outlier condition, the communication may be submitted for review. For example, after the system determines that the communication meets one or more of the outlier conditions described below (e.g., by performing one or more of the steps of the example method illustrated in FIG. 3), the communication may be submitted for review by an analyst. During such review, the analyst may inspect the communication and/or make a determination of whether the communication was sent for fraudulent reasons and/or whether the transmission of the communication constituted unauthorized use of the non-public information and/or computer system.

Figure 3:
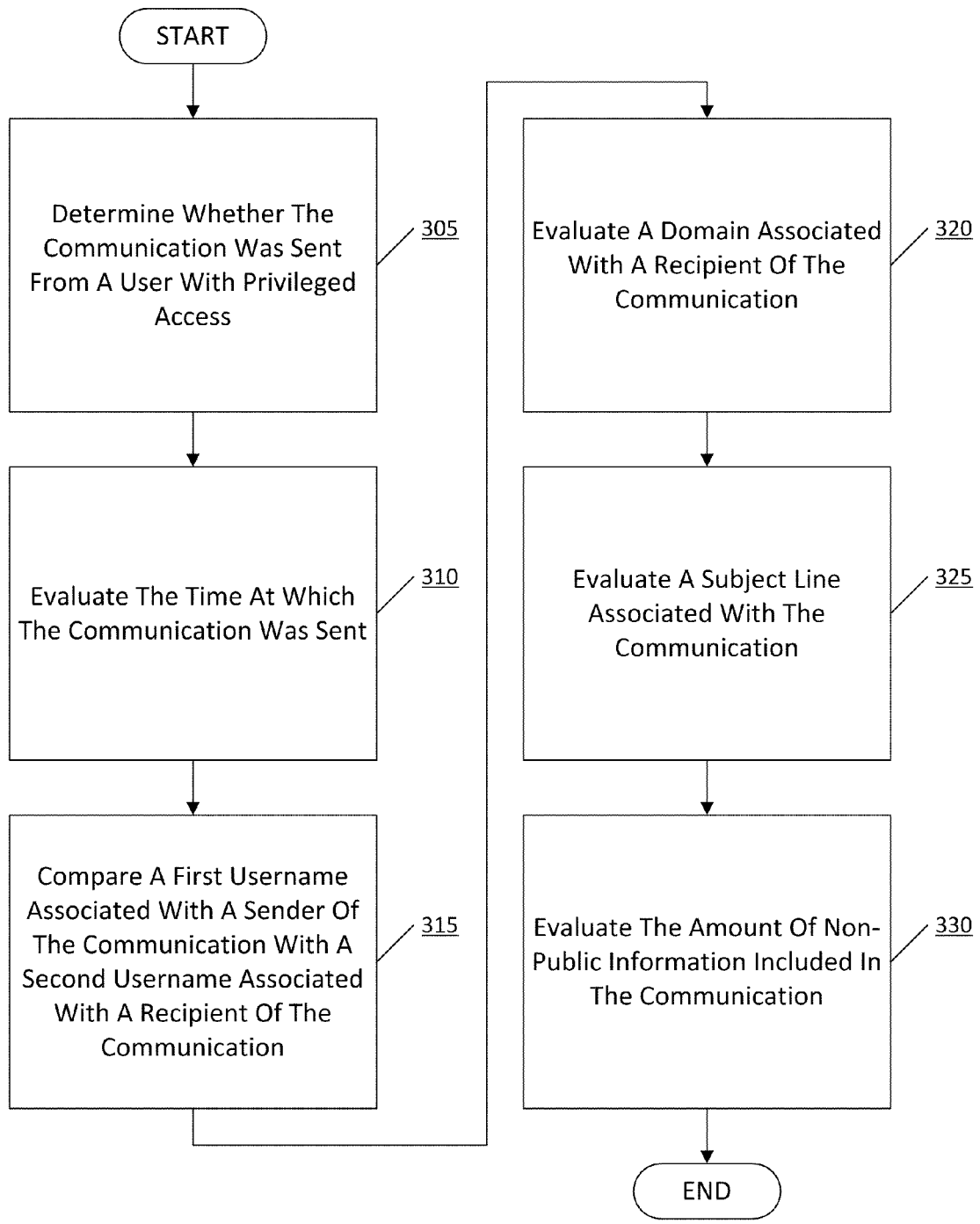
FIG. 3 illustrates an example method by which one or more outlier conditions may be evaluated according to one or more aspects described herein.

FIG. 3 illustrates an example method by which one or more outlier conditions may be evaluated according to one or more aspects described herein. In particular, one or more steps of the example method illustrated in FIG. 3 may be implemented by an organization, such as a financial institution, in determining whether a communication meets one or more outlier conditions. Additionally or alternatively, like the example method illustrated in FIG. 2, the example method illustrated in FIG. 3 may be performed by and/or in conjunction with one or more of the computing devices described herein operating alone or combination.

In step 305, it may be determined whether the communication was sent from a user with privileged access. For example, a system implementing one or more aspects of the disclosure may determine the user who sent the communication (e.g., by evaluating the header information for the communication to determine the sender and/or an origination address). Once the system determines the user who sent the communication, the system may determine whether the user has and/or had privileged access to non-confidential information (e.g., by searching for the user in a listing of users who have privileged access to non-confidential information and/or privileged access to one or more databases storing non-confidential information).

In at least one arrangement, if the system determines that the communication was sent from a user with privileged access (e.g., a user who has privileged access), the system then may determine that the communication meets an outlier condition. This may be because a user with privileged access likely may have a greater ability to access, view, use, and/or disseminate non-public information than a user who does not have such privileged access. Additionally or alternatively, if it is determined that the communication was sent from a user who does not have privileged access, it then may be determined that the communication does not meet an outlier condition. In some arrangements, even if it is not determined that the communication meets an outlier condition in this step, it still may be determined that the communication meets an outlier condition in one of the other steps of the example method.

In step 310, the time at which the communication was sent may be evaluated. For example, the system may determine the time at which the communication was sent (e.g., by evaluating the header information for the communication to determine the communication's timestamp). In at least one arrangement, if it is determined that the communication was sent outside of normal business hours (e.g., before 9:00 a.m. or after 6:00 p.m.), it then may be determined that the communication meets an outlier condition. Additionally or alternatively, the normal business hours of the particular sender of the communication may be taken into account in evaluating the time at which the communication was sent. For instance, if a sender of a communication typically works from 6:00 p.m. to 3:00 a.m., an email sent at 11:00 p.m. might not be determined to meet an outlier condition, whereas an email sent at 3:00 p.m. may be determined to meet an outlier condition. In at least one arrangement, the system may determine what constitutes normal business hours for a particular sender by querying one or more databases to determine the sender's job title, job description, hierarchical position, job privileges, hourly shift information, and/or the like.

In step 315, a first username associated with a sender of the communication may be compared with a second username associated with a recipient of the communication. In one or more arrangements, a system implementing one or more aspects of the disclosure may compare a first username associated with a sender of the communication with a second username associated with a recipient of the communication by performing one or more steps of the example method illustrated in FIG. 4, which is further described below. By analyzing usernames in this way (e.g., as further described below) and/or by implementing one or more aspects of the disclosure, an organization, such as a financial institution, may be able to identify instances in which an employee of the organization has attempted to send and/or has sent non-public information to the employee's personal email address for fraudulent purposes and/or other unauthorized use.

In step 320, a domain associated with a recipient of the communication may be evaluated. In one or more arrangements, a system implementing one or more aspects of the disclosure may evaluate a domain associated with a recipient of the communication by performing one or more steps of the example method illustrated in FIG. 7, which is further described below. By evaluating a domain in this way (e.g., as further described below) and/or by implementing one or more aspects of the disclosure, an organization, such as a financial institution, may be able to identify instances in which an employee of the organization has attempted to send and/or has sent non-public information to the employee's personal email address for fraudulent purposes and/or other unauthorized use.

In step 325, a subject line associated with the communication may be evaluated. For example, the system may determine whether a subject line associated with the communication is general, non-descriptive, and/or unusual for the type of information the communication contains (e.g., by evaluating the header information for the communication to determine, for instance, whether it has unusual and/or suspicious characteristics). In at least one arrangement, if the system determines that the subject line associated with the communication has unusual and/or suspicious characteristics, the system then may determine that the communication meets an outlier condition.

For instance, if the system determines that a subject line associated with a particular communication is blank and/or empty, the system may determine that the communication meets an outlier condition. This may be because it may be unusual for a communication that includes non-public information to be sent with a blank and/or empty subject line. In another example, if the system determines that a subject line associated with a particular communication includes unusual and/or non-specific words (e.g., "stuff," "miscellaneous," and the like), the system may determine that the communication meets an outlier condition. This may be because it may be unusual for a communication that includes non-public information to be sent with such a subject line.

In step 330, the amount of non-public information included in the communication may be evaluated. For example, the system may determine whether the amount of non-public information included in the communication exceeds a threshold. In at least one arrangement, a software tool may be used to decrypt, scan, and/or search the contents of the communication. Subsequently, one or more regular expressions and/or text search operations may be applied to the contents of the communication to identify non-public information (e.g., social security numbers, account numbers, and the like) and/or count the amount of non-public information included in the communication. Additionally or alternatively, exact string matching operations may be applied to the contents of the communication to identify non-public information. For instance, if account numbers commonly begin with a particular set of digits (e.g., "ABCDE"), then the particular set of digits may be searched for in the contents of the communication. Once the system determines the amount of non-public information included in the communication, the system may compare the determined amount with a threshold. If the amount of non-public information exceeds the threshold, the system may determine that the communication meets an outlier condition.

In at least one arrangement, different thresholds may be used in evaluating different types, sources, senders, recipients, and/or times of communications. For example, the threshold against which a communication is evaluated may vary based on one or more domains associated with one or more recipients of the communication. In other words, a first communication sent to a first recipient may be evaluated against a first threshold, while a second communication sent to a second recipient may be evaluated against a second threshold different from the first threshold. In this example, the first threshold may allow more non-public information than the second threshold because an organization monitoring the communications, such as a financial institution, may expect and/or allow more non-public information to be sent to and/or shared with the first recipient than the second recipient. For instance, the first recipient may be a law firm engaged by the organization to perform particular functions, and thus the organization may deem it acceptable for a communication to be sent to the law firm that includes up to five instances of non-public information. On the other hand, the second recipient may be a third party software vendor that provides technical support functions for the organization, and thus the organization may deem it unacceptable for a communication sent to the third party software vendor to include any instances of non-public information.

In at least one additional arrangement, the threshold against which a communication is evaluated may vary based on the sender of the communication. For example, a first communication sent by a first sender may be evaluated against a first threshold, while a second communication sent by a second sender may be evaluated against a second threshold different from the first threshold. In this example, the first threshold may allow more non-public information than the second threshold because an organization monitoring the communications, such as a financial institution, may expect and/or allow more non-public information to be sent by and/or shared from the first sender than the second sender. In one or more arrangements, the threshold associated with a particular sender may be determined based on the sender's job title, the sender's hierarchical position within the organization, and/or the sender's previous history of sending non-public information.

For instance, with regard to the previous example, the first sender may be a fraud investigator who must send non-public information via encrypted emails as part of their daily job functions, and thus the organization may deem it acceptable for a communication to be sent by the fraud investigator that includes up to ten instances of non-public information. In at least one arrangement, an instance of non-public information may refer to a customer name, a customer address, an account number, a social security number, and/or any other single piece of non-public information. On the other hand, the second sender may be a technical support specialist who should not be interacting with any non-public information, and thus the organization may deem it unacceptable for a communication sent by the technical support specialist to include any instances of non-public information. Thus, if the fraud investigator sends an encrypted email that includes six instances of non-public information, the relevant threshold might not be exceeded and the fraud investigator's communication might not be considered to meet an outlier condition, whereas if the technical support specialist sends an encrypted email that includes two instances of non-public information, the relevant threshold may be exceeded and the technical support specialist's communication may be considered to meet an outlier condition. In this instance, the system may determine the sender's job title (e.g., by searching one or more databases and/or other information sources to determine each sender's job title based on their email address), and the system subsequently may determine and/or select the appropriate threshold for each communication as described above (e.g., the system may select a more sensitive threshold for a technical support specialist than a fraud investigator).

In another instance, and also with regard to the same example above, the first sender may be a group manager who must send non-public information via encrypted emails as part of their daily job functions (e.g., following up directly with customers), and thus the organization may deem it acceptable for a communication to be sent by the group manager that includes up to ten instances of non-public information. On the other hand, the second sender may be a group associate who should not be sending non-public information via email (e.g., because they should be handing off to the group manager cases in which direct customer follow up is required), and thus the organization may deem it unacceptable for a communication sent by the group associate to include any instances of non-public information. Thus, if the group manager sends an encrypted email that includes six instances of non-public information, the relevant threshold might not be exceeded and the group manager's communication might not be considered to meet an outlier condition, whereas if the group associate sends an encrypted email that includes two instances of non-public information, the relevant threshold may be exceeded and the group associate's communication may be considered to meet an outlier condition. In this instance, the system may determine the sender's hierarchical position within the organization (e.g., by searching one or more databases and/or other information sources to determine each sender's hierarchical position within the organization based on their email address), and the system subsequently may determine and/or select the appropriate threshold for each communication as described above (e.g., the system may select a more sensitive threshold for a group associate than a group manager).

In another instance, and also with regard to the same example above, the first sender may be a first employee who has previously sent multiple emails that included non-public information as part of his or her daily job functions, and thus the organization may deem it acceptable for a communication to be sent by the first employee that includes a typical number of instances of non-public information. On the other hand, the second sender may be a second employee who has not previously sent an email that included non-public information, and thus the organization may deem it unacceptable for a communication to be sent by the second employee that includes any instances of non-public information (e.g., because communications sent by the second employee typically do not include non-public information). In at least one arrangement, the system may determine the typical number of instances of non-public information for communications sent by each employee by monitoring and/or analyzing previous communications sent by each employee. Thus, if the first employee sends an encrypted email that includes twenty instances of non-public information, and if twenty instances of non-public information is within one or two standard deviations of the amount of non-public information the first employee typically sends (e.g., based on a sample of the last month, last two months, and the like), then the relevant threshold might not be exceeded and the first employee's communication might not be considered to meet an outlier condition. However, if the second employee sends an encrypted email that includes five instances of non-public information, and if five instances of non-public information is not within one or two standard deviations of the amount of non-public information the second employee typically sends (e.g., based on a sample of the last month, last two months, and the like), then the relevant threshold may be exceeded and the second employee's communication may be considered to meet an outlier condition. In this instance, the system may determine the typical number of instances of non-public information for communications sent by each employee by monitoring and/or analyzing previous communications sent by each employee, and the system subsequently may determine the appropriate threshold for each communication based on the determined typical number of instances of non-public information for communications sent by each employee.

In one or more additional arrangements, the one or more thresholds against which the amount of non-public information of one or more communications is compared may be modified automatically and/or updated automatically by the system based on previously collected and/or analyzed data. Among other things, the system may automatically determine and/or set amount limits and/or frequency limits for the thresholds based on such previously collected and/or analyzed data. An amount limit may limit the number of communications (and/or the number of instances of non-public information) that a particular user may send. Additionally or alternatively, a frequency limit may limit the number of communications (and/or the number of instances of non-public information) that a particular user may send during a particular time period. For example, with regard to the example above involving the fraud investigator and the technical support specialist, the system may determine, over a period of time (e.g., two months), that the fraud investigator sends at least five emails per month which include fifty instances of non-public information (i.e., thirty more instances of non-public information than permitted by the then-current threshold). In addition, the system may determine, based on electronic records stored in one or more databases, that after these emails were determined to meet an outlier condition and subsequently reviewed, these emails were determined to be legitimate during the review process. Accordingly, the system may automatically modify and/or update the threshold for the fraud investigator, such that the fraud investigator may send at least five emails per month which include up to fifty instances of non-public information without any of these emails being determined to meet an outlier condition. Additionally or alternatively, the system may configure the threshold for the fraud investigator such that if the fraud investigator sends more than five emails with more than fifty instances of non-public information in a month, and/or if the fraud investigator sends an email with more than seventy instances of non-public information in a month (e.g., one standard deviation above the new threshold), such a communication may be determined to meet an outlier condition.

Figure 4:
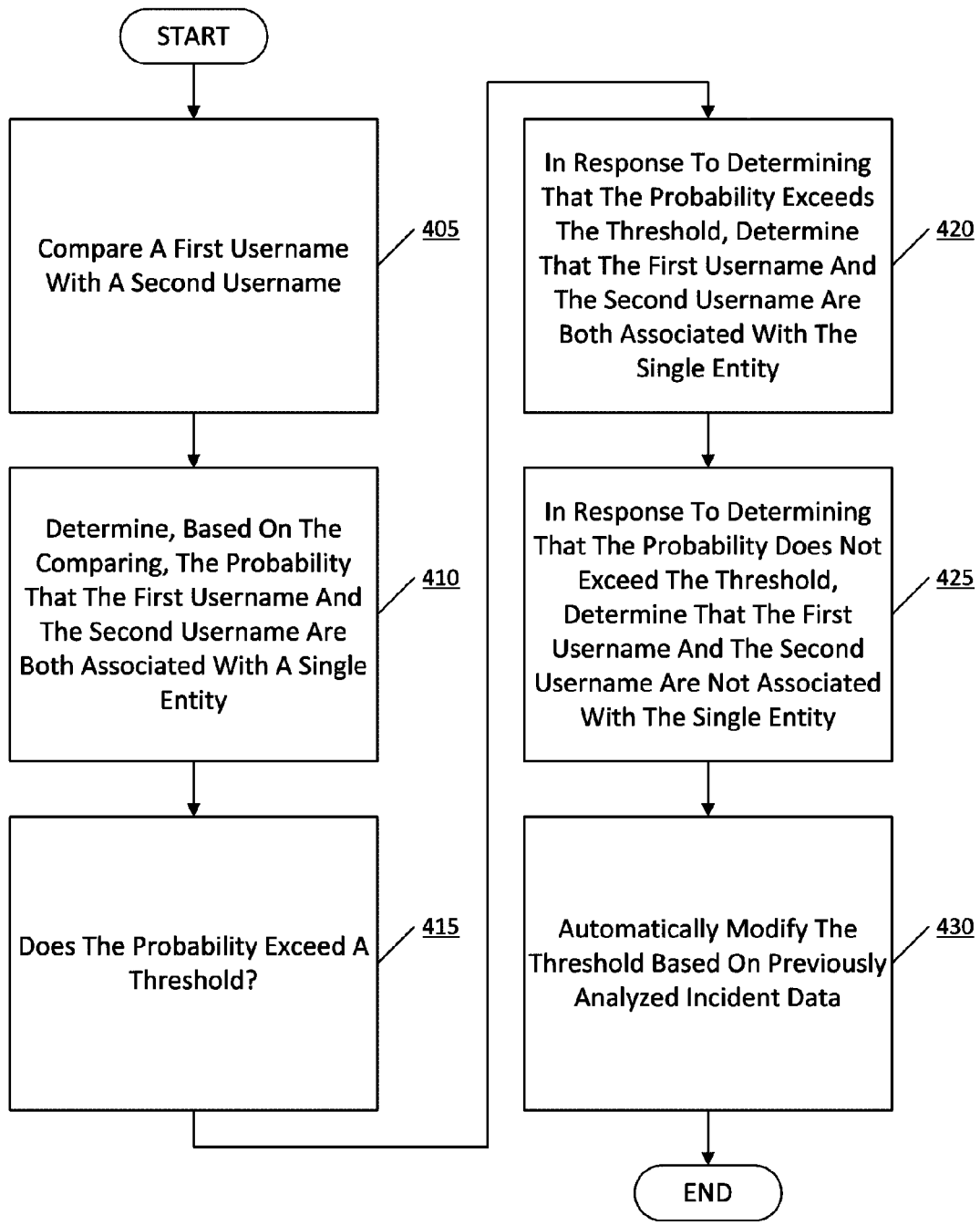
FIG. 4 illustrates an example method by which one or more usernames may be analyzed according to one or more aspects described herein.

FIG. 4 illustrates an example method by which one or more usernames may be analyzed according to one or more aspects described herein. In one or more arrangements, like the example method illustrated in FIG. 2, the example method illustrated in FIG. 4 may be performed by and/or in conjunction with one or more of the computing devices described herein operating alone or in combination.

In step 405, a first username may be compared with a second username. The first username may be associated with a sender of a communication, and the second username may be associated with a recipient of the communication. In one or more arrangements, a system implementing one or more aspects of the disclosure may compare the first username with the second username by performing one or more steps of the example method illustrated in FIG. 5, which is further described below. By comparing usernames in this way (e.g., as further described below) and/or by implementing one or more aspects of the disclosure, an organization, such as a financial institution, may be able to determine the probability that the first username and the second username are both associated with a single entity.

In step 410, the probability that the first username and the second username are both associated with a single entity may be determined based on the comparing. For example, a numerical value representing the probability may be obtained by performing one or more steps of the example method illustrated in FIG. 5.

In step 415, it may be determined whether the probability exceeds a threshold. For example, the system may compare the probability determined in step 410 with a threshold probability, and the system may determine whether the probability exceeds the threshold. The threshold may be predetermined (e.g., by an organization operating the system), or the threshold may be set after being automatically modified based on previously analyzed incident data in step 430, which is further described below. In at least one arrangement, the threshold may be predetermined to be sixty percent.

In step 420, in response to determining that the probability exceeds the threshold, it may be determined that the first username and the second username are both associated with the single entity. For example, if the threshold is sixty percent, and if the probability is determined to be eighty-three percent, then it may be determined that the first username and the second username are both associated with the single entity.

In step 425, in response to determining that the probability does not exceed the threshold, it may be determined that the first username and the second username are not associated with the single entity. For example, if the threshold is sixty percent, and if the probability is determined to be fifty-five percent, then it may be determined that the first username and the second username are not associated with the single entity.

In step 430, the threshold may be automatically modified based on previously analyzed incident data. For example, as incidents are analyzed and/or according to a schedule, the system may automatically update and/or modify the threshold based on previously analyzed incident data to improve system performance and/or the efficiency of the communication review process.

In at least one arrangement, for instance, on a monthly basis, the system may evaluate the number of communications determined to meet at least one outlier condition based on one or more username-matching criteria and referred to the review process that ultimately were determined to be legitimate during the review process. If this number is determined to be too large (e.g., if more than ten percent of the emails referred to the review process based on the one or more username-matching criteria were ultimately determined to be legitimate), then the system may automatically increase the threshold (e.g., from sixty percent to sixty-five percent), such that a greater probability is required for a communication to meet an outlier condition and/or for the communication to be referred to the review process. On the other hand, if this number is determined to be too small (e.g., if less than one percent of the emails referred to the review process based on the one or more username-matching criteria were ultimately determined to be legitimate), then the system may automatically decrease the threshold (e.g., from sixty percent to fifty-five percent), such that a lesser probability is required for a communication to meet an outlier condition and/or for the communication to be referred to the review process. Of course, in this example, if the threshold is already at fifty-five percent and the threshold is to be reduced further, the threshold may be lowered to fifty percent, and if the threshold is already at sixty-five percent and the threshold is to be increased further, the threshold may be increased to seventy percent, and so on.

Figure 5:
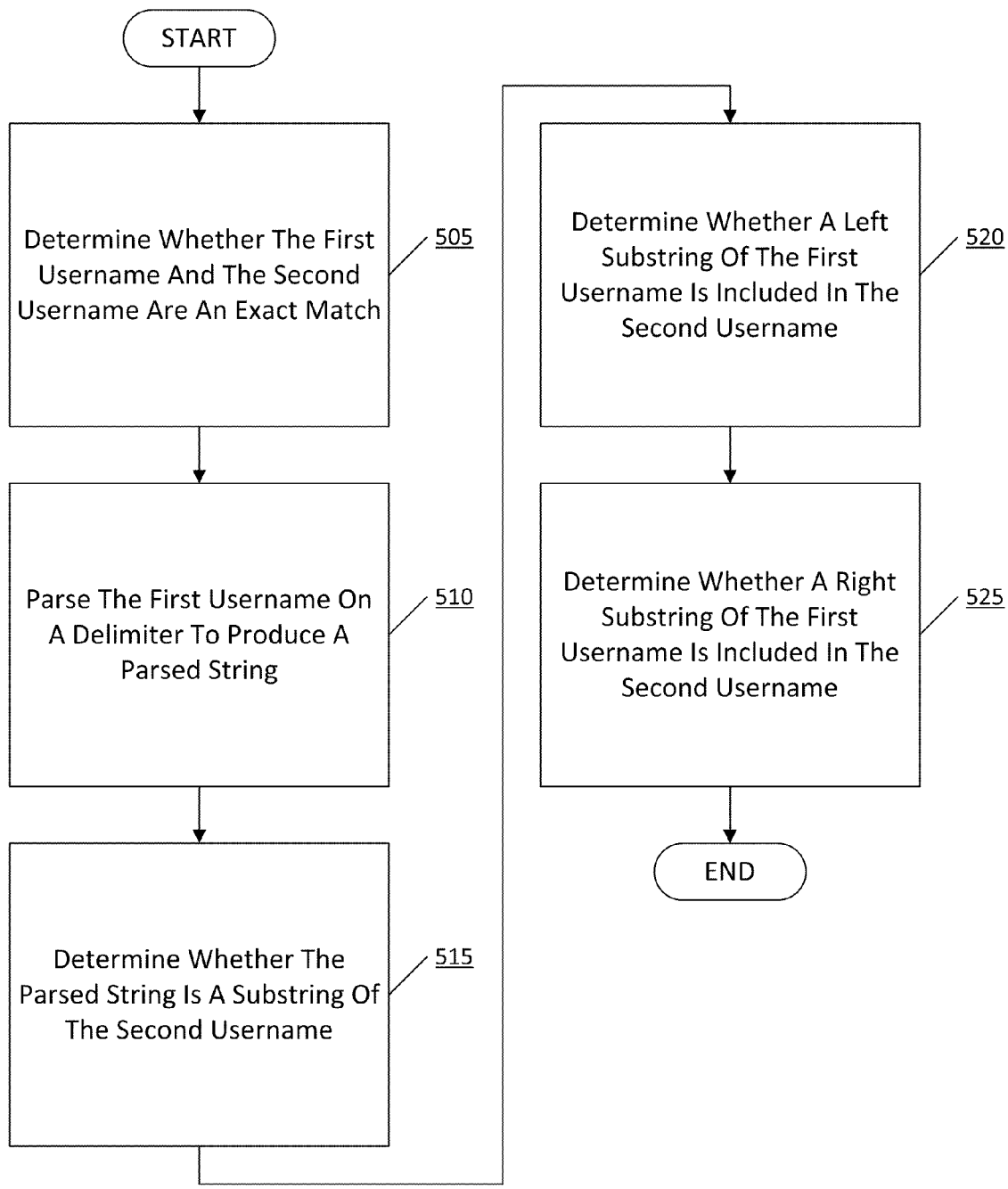
FIG. 5 illustrates an example method by which one or more usernames may be compared according to one or more aspects described herein.

FIG. 5 illustrates an example method by which one or more usernames may be compared according to one or more aspects described herein. In one or more arrangements, like the example method illustrated in FIG. 2, the example method illustrated in FIG. 5 may be performed by and/or in conjunction with one or more of the computing devices described herein operating alone or in combination.

In step 505, it may be determined whether the first username and the second username are an exact match. For example, a system implementing one or more aspects of the disclosure may compare the first username and the second username using one or more character matching functions and/or string matching functions. If the system determines that the first username and the second username are an exact match, the system may determine that the probability that the first username and the second username are both associated with a single entity is one-hundred percent. In this example, the system may determine this probability to be one-hundred percent because this percentage may represent the percentage of characters included in the second username that also are included in the first username, and/or vice versa. On the other hand, if the system determines that the first username and the second username are not an exact match, the method may continue to step 510. Additionally or alternatively, if the system determines that the first username and the second username are not an exact match, the system might determine that the probability that the first username and the second username are both associated with a single entity is zero percent. Of course, if the system determines this probability to be zero percent, the system subsequently may update and/or replace this probability determination in performing one or more of the other steps of the example method illustrated in FIG. 5, as further described below.

In step 510, the first username may be parsed on a delimiter to produce a parsed string. For example, the system may use a regular expression and/or another string and/or character matching function to parse the first username on a delimiter, such as a period or an underscore. Other delimiters that might be used in the parsing include a dash, a comma, and/or any other character. In at least one arrangement, by parsing the first username on the delimiter, the system may produce a parsed string. The parsed string may include a series of characters that represents all characters in the username up to the delimiter. For instance, if the username "AAAA.BBBBBBB" were parsed (e.g., the username of an email address of "AAAA.BBBBBBB@CCCCC.com") on a delimiter of ".," the parsed string produced may include "AAAA," which represents the characters in the username up to the delimiter.

In step 515, it may be determined whether the parsed string is a substring of the second username. For example, the system may compare the parsed string and the second username using one or more character matching functions and/or string matching functions to make a probability determination similar to the one described above in step 505. In particular, the system may determine the percentage of characters included in the second username that are also included in the parsed string, and this percentage may represent the probability that the first username and the second username are both associated with a single entity. For instance, if the parsed string produced in step 510 is "AAAA," and if the second username is "AAAA.BBBBBB" (e.g., the username of an email address of "AAAA.BBBBBB@DDDD.com"), then the system may determine the probability to be forty percent, as the string "AAAA" may constitute forty percent of the string "AAAA.BBBBBB." On the other hand, if the system determines that the parsed string is not included as a substring in the second username (e.g., if the second username does not include the sequence of characters "AAAA"), then the method may continue to step 520. Additionally or alternatively, if the system determines that the parsed string is not included as a substring in the second username, the system might determine that the probability that the first username and the second username are both associated with a single entity is zero percent. As in step 505, if the system determines this probability to be zero percent, the system subsequently may update and/or replace this probability determination in performing one or more of the other steps of the example method illustrated in FIG. 5.

In step 520, it may be determined whether a left substring of the first username is included in the second username. For example, if the first username is "ABCDEFG," and if the second username is "ABCDEFZ," the system may successively compare one or more increasingly long left substrings of the first username against the left side of the second username to determine the length (e.g., the number of characters) of the longest left substring of the first username that is also included in the second username. Subsequently, the system may divide the length of this longest left substring by the length of the shorter of the first username and the second username to calculate a percentage, and this percentage may represent the probability that the first username and the second username are both associated with a single entity. For instance, if the first username is "ABCDEFGH," and if the second username is "ABCDEFXYZ," then the longest left substring is "ABCDEF," which is six characters long. Subsequently, in this example, the system may calculate a percentage by dividing six (e.g., the length of the longest left substring of the first username that is also included in the second username) by eight (e.g., the length of the shorter of the first username and the second username), and the system may determine this percentage to be 0.75 or seventy-five percent. Thus, in this example, the system may determine that the probability of the first username and the second username being associated with a single entity is seventy-five percent.

In at least one arrangement, if the system determines that there is no left substring of the first username that is included in the left side of the second username and that also is at least two characters in length, then the method may continue to step 525. Additionally or alternatively, if the system determines that there is no left substring of the first username that is included in the left side of the second username and that also is at least two characters in length, the system might determine that the probability that the first username and the second username are both associated with a single entity is zero percent. As in step 505, if the system determines this probability to be zero percent, the system subsequently may update and/or replace this probability determination in performing one or more of the other steps of the example method illustrated in FIG. 5.

In step 525, it may be determined whether a right substring of the first username is included in the second username. In performing step 525, the system may perform steps similar to those described above with respect to step 520, except that the system may use a right substring rather than a left substring. For example, if the first username is "ABCDEFGH," and if the second username is "ZYCDEFGH," the system may successively compare one or more increasingly long right substrings of the first username against the right side of the second username to determine the length (e.g., the number of characters) of the longest right substring of the first username that is also included in the second username. Subsequently, the system may divide the length of this longest right substring by the length of the shorter of the first username and the second username to calculate a percentage, and this percentage may represent the probability that the first username and the second username are both associated with a single entity. For instance, if the first username is "ABCDEFGH," and if the second username is "ZYCDEFGH," then the longest right substring is "CDEFGH," which is six characters long. In this example, the longest substring may be "CDEFGH" because starting from the right side of each string and moving towards the left, "CDEFGH" is the longest string of characters matched in both strings. Subsequently, in this example, the system may calculate a percentage by dividing six (e.g., the length of the longest right substring of the first username that is also included in the second username) by eight (e.g., the length of the shorter of the first username and the second username), and the system may determine this percentage to be 0.75 or seventy-five percent. Thus, in this example, the system may determine that the probability of the first username and the second username being associated with a single entity is seventy-five percent.

In at least one arrangement, if the system determines that there is no right substring of the first username that is included in the right side of the second username and that also is at least two characters in length, then the method may continue to step 525. Additionally or alternatively, if the system determines that there is no right substring of the first username that is included in the right side of the second username and that also is at least two characters in length, the system might determine that the probability that the first username and the second username are both associated with a single entity is zero percent. As in step 505, if the system determines this probability to be zero percent, the system subsequently may update and/or replace this probability determination in performing one or more of the other steps of the example method illustrated in FIG. 5.

Figure 6:
FIG. 6 illustrates an example table including sample results of username analysis according to one or more aspects described herein.

FIG. 6 illustrates an example table including sample results of username analysis according to one or more aspects described herein. For example, as seen in table 600, in an example situation where "first.last@company.com" sends an email to "first.last@personal.com," a system implementing one or more aspects of the disclosure may determine that the username of the sender (e.g., the characters to the left of the "@" symbol, which here are "first.last") is a one-hundred percent match to the username of the recipient (i.e., "first.last") by performing one or more steps of the example method illustrated in FIG. 5. Thus, in this example situation, the system further may determine that the probability that the first username and the second username are both associated with a single entity is one-hundred percent. Additionally or alternatively, the system might determine that the email communication in this example meets an outlier condition, as the threshold described above may be sixty percent.

As also seen in table 600, in another example situation in which "flast@company.com" sends an email to "first.last@personal.com," the system may determine that the username of the sender (i.e., "flast") is an eighty-three percent match to the username of the recipient (i.e., "first.last") by performing one or more steps of the example method illustrated in FIG. 5. Thus, in this example situation, the system further may determine that the probability that the first username and the second username are both associated with a single entity is eighty-three percent. Additionally or alternatively, the system might determine that the email communication in this example meets an outlier condition, as the threshold described above may be sixty percent.

As further seen in table 600, in yet another example situation in which "first1.last1@company.com" sends an email to "first2.last1@personal.com," the system may determine that the username of the sender (i.e., "first1.last1") is a fifty-five percent match to the username of the recipient (i.e., "first2.last1") by performing one or more steps of the example method illustrated in FIG. 5. Thus, in this example situation, the further may determine that the probability that the first username and the second username are both associated with a single entity is fifty-five percent. Additionally or alternatively, the system might determine that the email communication in this example does not meet an outlier condition, as the threshold described above may be sixty percent.

Figure 7A:
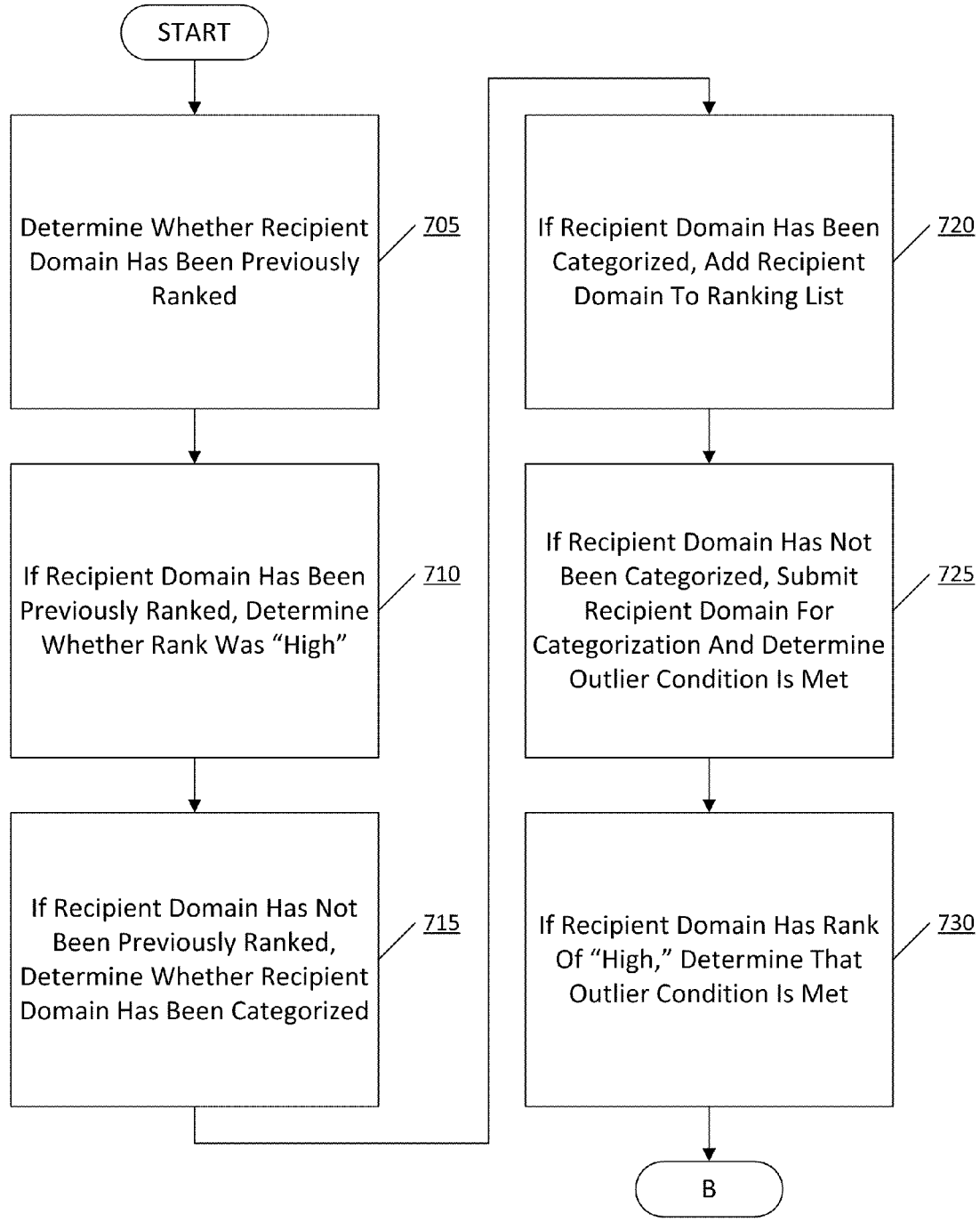
FIGS. 7A-7B illustrate an example method by which one or more domains may be evaluated according to one or more aspects described herein.
Figure 7B:
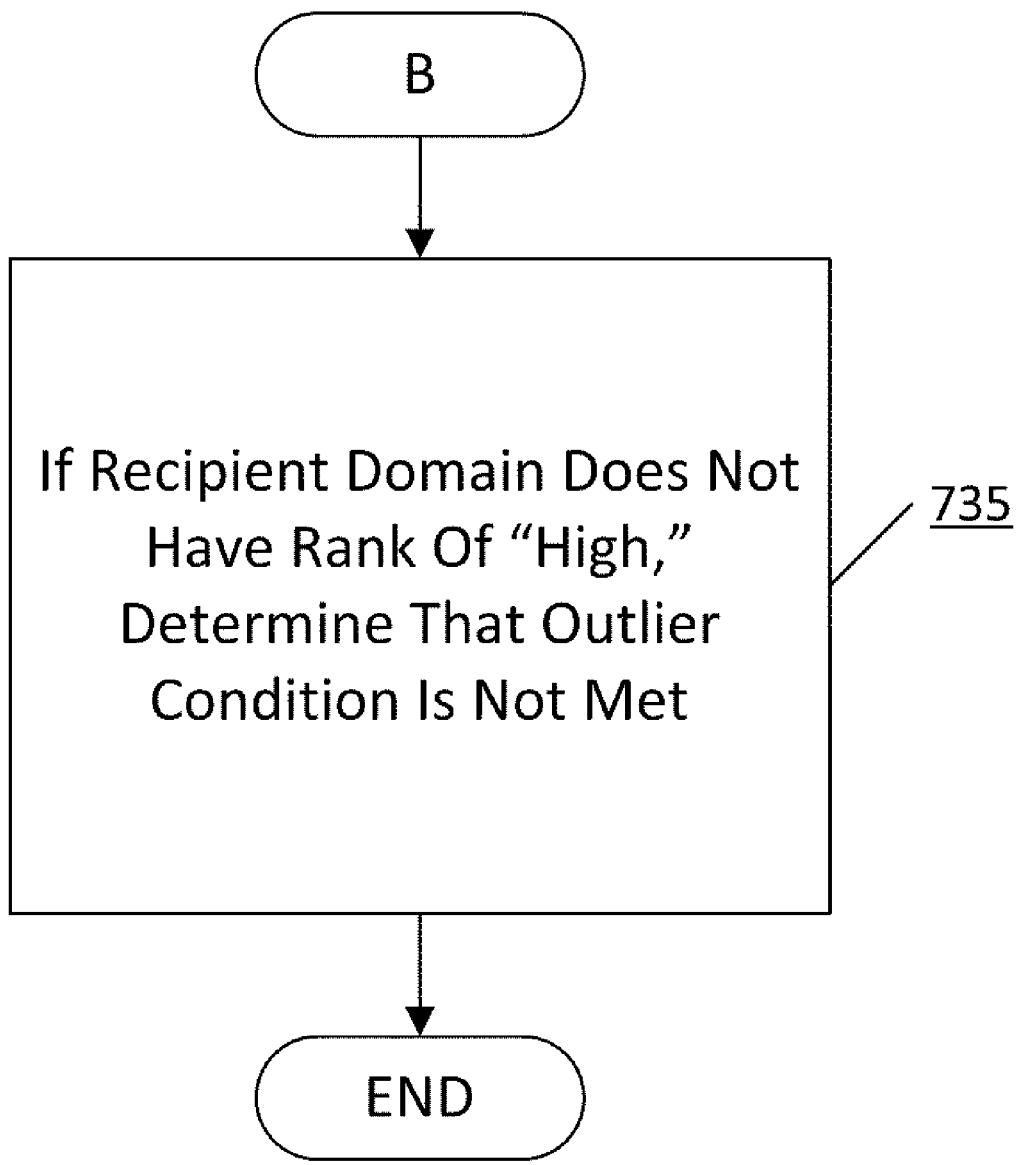

FIGS. 7A-7B illustrate an example method by which one or more domains may be evaluated according to one or more aspects described herein. In one or more arrangements, like the example method illustrated in FIG. 2, the example method illustrated in FIGS. 7A-7B may be performed by and/or in conjunction with one or more of the computing devices described herein operating alone or in combination.

In step 705, it may be determined whether the recipient domain has been previously ranked. In at least one arrangement, the recipient domain may be the web domain associated with a recipient of a particular communication being analyzed by a system implementing one or more aspects of the disclosure. For instance, if a recipient of a communication is "first.last@personal.com," the recipient domain may be "personal.com." In one or more arrangements, the system may determine whether the recipient domain has been previously ranked by querying a database that stores domain risk rankings for previously ranked domains. A domain may ranked as "high" risk, "moderate" risk, and/or "low" risk based on automated and/or manual analysis. For instance, a domain may be ranked automatically by the system via a process in which the system cross-references the domain against a trusted vendor list, one or more other security assessments, and/or other previously stored data. Additionally or alternatively, a domain may be ranked manually by a risk analyst using similar and/or other information.

In step 710, if the recipient domain has been previously ranked, it may be determined whether the rank was high. For example, if the system determines that the recipient domain was previously ranked (e.g., based on one or more database queries, as described above), the system then may determine whether recipient domain was ranked as a "high" risk (e.g., based on the same and/or one or more other database queries).

In step 715, if the recipient domain has not been previously ranked, it may be determined whether the recipient domain has been categorized. In at least one arrangement, a software tool, which is made commercially available may be used in conjunction with the system. For example, the software tool may store (e.g., in a database) one or more risk categorizations for one or more websites and/or domains. The risk categorizations may be determined by the software tool, and in addition to categorizing domains as "high" risk, "medium" risk, and/or "low" risk, the software tool also may categorize domains based on organization type (e.g., finance, news agency, online shopping, healthcare, education, and the like). In one or more arrangements, where a recipient domain has not been previously ranked (e.g., internally by the organization), it may be desirable to use a risk categorization (e.g., as a fall back standard against which the recipient domain may be analyzed, even though the risk categorization may be determined by an external entity, rather than the organization itself).

In step 720, if the recipient domain has been categorized, the recipient domain may be added to a ranking list. For example, if the recipient domain has been categorized and/or if the recipient domain has not been ranked, the system may add the recipient domain to a ranking list, which may represent one or more domains to be analyzed and/or ranked by the organization in the future.

In step 725, if the recipient domain has not been categorized, the recipient domain may be submitted for categorization, and it may be determined that an outlier condition is met. For example, if the recipient domain has not been categorized (e.g., by the software tool), the system may submit the recipient domain for categorization. Additionally or alternatively, the system may determine that an outlier condition is met. It may be desirable to determine that an outlier condition is met in a situation where the recipient domain has not been categorized and/or ranked because in such a situation, the recipient domain may represent a newly encountered potential threat to information security. As described above, determining that an outlier condition is met may result in the particular communication being submitted for review.

In step 730, if the recipient domain has a rank of high, it may be determined that an outlier condition is met. Additionally or alternatively, if the recipient domain has been categorized as a "high" risk, it may be determined that an outlier condition is met. For example, if the system determined (e.g., in step 710) that the recipient domain was ranked as a "high" risk, the system may determine that an outlier condition is met. Again, as described above, determining that an outlier condition is met may result in the particular communication being submitted for review.

In step 735, if the recipient domain does not have a rank of high, it may be determined that an outlier condition is not met. For example, if the system determined (e.g., in step 710) that the recipient domain was not ranked as a "high" risk and/or if the system determined (e.g., in step 715) that the recipient domain has not been categorized as a "high" risk, the system might not determine that an outlier condition is met.

Various aspects described herein may be embodied as a method, an apparatus, or as one or more computer-readable media storing computer-executable instructions. Accordingly, those aspects may take the form of an entirely hardware embodiment, an entirely software embodiment, or an embodiment combining software and hardware aspects. Any and/or all of the method steps described herein may be embodied in computer-executable instructions. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. A method, comprising:
   comparing a first username with a second username, the first username being associated with a sender of a communication, and the second username being associated with a recipient of the communication;
   determining, based on the comparing, a probability that the first username and the second username are both associated with a single entity;
   determining whether the probability that the first username and the second username are both associated with a single entity exceeds a threshold;
   responsive to determining that the probability that the first username and the second username are both associated with a single entity exceeds the threshold, referring the communication to a review process;
   responsive to determining that the probability that the first username and the second username are both associated with a single entity does not exceed the threshold, failing to refer the communication to the review process; and
   adjusting the threshold based on whether one or more communications referred to the review process were determined during the review process to have a first username associated with a sender of the one or more communications and a second username associated with a recipient of the one or more communications that are both associated with a single entity.

2. The method of claim 1, wherein comparing a first username with a second username includes determining whether the first username and the second username are an exact match.

3. The method of claim 1, wherein comparing a first username with a second username includes:
   parsing the first username on a delimiter to produce a parsed string; and
   determining whether the parsed string is a substring of the second username.

4. The method of claim 1, wherein comparing a first username with a second username includes determining whether a left substring of the first username is included in the second username.

5. The method of claim 1, wherein comparing a first username with a second username includes determining whether a right substring of the first username is included in the second username.

6. The method of claim 1, further comprising:
in response to determining that the probability exceeds a threshold, determining that the first username and the second username are both associated with the single entity.

7. The method of claim 6, further comprising:
automatically modifying the threshold based on previously analyzed incident data.

8. An apparatus, comprising:
at least one processor; and
at least one memory storing computer-executable instructions that, when executed by the at least one processor, cause the apparatus to:
compare a first username with a second username, the first username being associated with a sender of a communication, and the second username being associated with a recipient of the communication;
determine, based on the comparing, a probability that the first username and the second username are both associated with a single entity;
determine whether the probability that the first username and the second username are both associated with a single entity exceeds a threshold;
responsive to determining that the probability that the first username and the second username are both associated with a single entity exceeds the threshold, refer the communication to a review process;
responsive to determining that the probability that the first username and the second username are both associated with a single entity does not exceed the threshold, fail to refer the communication to the review process; and
adjust the threshold based on whether one or more communications referred to the review process were determined during the review process to have a first username associated with a sender of the one or more communications and a second username associated with a recipient of the one or more communications that are both associated with a single entity.

9. The apparatus of claim 8, wherein comparing a first username with a second username includes determining whether the first username and the second username are an exact match.

10. The apparatus of claim 8, wherein comparing a first username with a second username includes:
parsing the first username on a delimiter to produce a parsed string; and
determining whether the parsed string is a substring of the second username.

11. The apparatus of claim 8, wherein comparing a first username with a second username includes determining whether a left substring of the first username is included in the second username.

12. The apparatus of claim 8, wherein comparing a first username with a second username includes determining whether a right substring of the first username is included in the second username.

13. The apparatus of claim 8, wherein the at least one memory stores additional computer-executable instructions that, when executed by the at least one processor, further cause the apparatus to:
in response to determining that the probability exceeds a threshold, determine that the first username and the second username are both associated with the single entity.

14. The apparatus of claim 13, wherein the at least one memory stores additional computer-executable instructions that, when executed by the at least one processor, further cause the apparatus to:
automatically modify the threshold based on previously analyzed incident data.

15. At least one non-transitory computer-readable medium storing computer-executable instructions that, when executed by at least one processor, cause the at least one processor to:
compare a first username with a second username, the first username being associated with a sender of a communication, and the second username being associated with a recipient of the communication;
determine, based on the comparing, a probability that the first username and the second username are both associated with a single entity;
determine whether the probability that the first username and the second username are both associated with a single entity exceeds a threshold;
responsive to determining that the probability that the first username and the second username are both associated with a single entity exceeds the threshold, refer the communication to a review process;
responsive to determining that the probability that the first username and the second username are both associated with a single entity does not exceed the threshold, fail to refer the communication to the review process; and
adjust the threshold based on whether one or more communications referred to the review process were determined during the review process to have a first username associated with a sender of the one or more communications and a second username associated with a recipient of the one or more communications that are both associated with a single entity.

16. The at least one non-transitory computer-readable medium of claim 15, wherein comparing a first username with a second username includes determining whether the first username and the second username are an exact match.

17. The at least one non-transitory computer-readable medium of claim 15, wherein comparing a first username with a second username includes:
parsing the first username on a delimiter to produce a parsed string; and
determining whether the parsed string is a substring of the second username.

18. The at least one non-transitory computer-readable medium of claim 15, wherein comparing a first username with a second username includes determining whether a left substring of the first username is included in the second username.

19. The at least one non-transitory computer-readable medium of claim 15, wherein comparing a first username with a second username includes determining whether a right substring of the first username is included in the second username.

20. The at least one non-transitory computer-readable medium of claim 15 storing additional computer-executable instructions that, when executed by the at least one processor, further cause the at least one processor to:

in response to determining that the probability exceeds a threshold, determine that the first username and the second username are both associated with the single entity.

21. The at least one non-transitory computer-readable medium of claim 20 storing additional computer-executable instructions that, when executed by the at least one processor, further cause the at least one processor to:
automatically modify the threshold based on previously analyzed incident data.

* * * * *